(12) United States Patent
Agarwal et al.

(10) Patent No.: US 9,760,655 B2
(45) Date of Patent: Sep. 12, 2017

(54) SYSTEMS AND METHODS FOR DISCOVERING TEMPORAL PATTERNS IN TIME VARIANT BIPARTITE GRAPHS

(71) Applicant: International Business Machines Corporation, Armonk, NY (US)

(72) Inventors: Manoj Kumar Agarwal, Noida (IN); Sumit Negi, New Delhi (IN); L. Venkata Subramaniam, Gurgaon (IN); Oliver Markus Vogel, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 451 days.

(21) Appl. No.: 14/016,815

(22) Filed: Sep. 3, 2013

(65) Prior Publication Data

US 2015/0066990 A1   Mar. 5, 2015

(51) Int. Cl.
G06F 17/30   (2006.01)

(52) U.S. Cl.
CPC .. G06F 17/30958 (2013.01); G06F 17/30265 (2013.01); G06F 17/30268 (2013.01); G06F 17/30864 (2013.01)

(58) Field of Classification Search
CPC ......... G06F 17/30265; G06F 17/30268; G06F 17/30864; G06F 17/30958

(Continued)

(56) References Cited

U.S. PATENT DOCUMENTS 7,113,505 B2 *   9/2006   Williams ............... H04Q 11/06
                                                       370/370
7,730,085 B2   6/2010   Hassan et al.
(Continued)

FOREIGN PATENT DOCUMENTS

WO   WO2012115662 A1   8/2012

OTHER PUBLICATIONS

Tong, Hanghang et al.,"Proximity Tracking on Time-Evolving Bipartite Graphs," Proceedings 2008 SIAM Conference on Data Mining, Atlanta, Georgia, Apr. 24-26, 2008, pp. 704-715. Copy available at https://www.siam.org/proceedings/datamining/2008/dm08_64_Tong.pdf accessed Aug. 30, 2013.

(Continued)

*Primary Examiner* — Frantz Coby
(74) *Attorney, Agent, or Firm* — Ference & Associates LLC

(57) ABSTRACT

Systems and methods for identifying entities sharing a temporal pattern using bipartite graphs are described. In one embodiment, a method includes identifying a temporal pattern in a sequence of bipartite graphs for a sequence of records involving two entity types, where records of the sequence of bipartite graphs vary according to time. An embodiment may color code the edges between entity types in the sequence of bipartite graphs according to the at least one temporal pattern identified (e.g., increasing sales between a business representative and a customer). An embodiment may therefore identify a time-based relationship between at least two entities according to the coded edges. Given the identification of entities having a time-based relationships, groups of these entities may be identified and trends may be derived therefrom (e.g., increasing sales for business units of a particular geographic region).

25 Claims, 5 Drawing Sheets

(58) Field of Classification Search
USPC .................... 707/794, 797, 798, 803, 804
See application file for complete search history.

(56) References Cited

U.S. PATENT DOCUMENTS

| | | | |
|---|---|---|---|
| 7,778,945 | B2 | 8/2010 | Gunawardana et al. |
| 7,805,440 | B2* | 9/2010 | Farrell .............. G06F 17/30958 707/728 |
| 7,818,279 | B2* | 10/2010 | Liu .................. G06F 17/30864 706/55 |
| 8,051,032 | B2* | 11/2011 | Cooper ............ G06F 17/30339 707/602 |
| 8,089,959 | B2* | 1/2012 | Szymanski ......... H04L 12/5601 370/359 |
| 8,489,625 | B2* | 7/2013 | Ni .................... G06F 17/30867 455/456.1 |
| 8,612,169 | B2* | 12/2013 | Lin et al. ........................ 702/85 |
| 2005/0246606 | A1* | 11/2005 | Cameron et al. ............. 714/752 |
| 2007/0143300 | A1* | 6/2007 | Gulli ................ G06F 17/30551 |
| 2007/0294692 | A1* | 12/2007 | Zhao .................. G06F 9/4875 718/102 |
| 2008/0220977 | A1* | 9/2008 | Imoto et al. ...................... 506/2 |
| 2009/0063455 | A1* | 3/2009 | Li et al. ............................. 707/5 |
| 2009/0160860 | A1* | 6/2009 | Slaney et al. .................. 345/440 |
| 2010/0223276 | A1* | 9/2010 | Al-Shameri ....... G06F 17/30333 707/769 |
| 2011/0231215 | A1* | 9/2011 | Santos ................... G06F 17/11 705/7.12 |
| 2011/0264482 | A1* | 10/2011 | Rahmouni ............ G06Q 10/06 705/7.26 |
| 2012/0278021 | A1* | 11/2012 | Lin ........................ G06F 17/10 702/85 |
| 2013/0024443 | A1* | 1/2013 | Achuthan ......... G06F 17/30392 707/722 |
| 2014/0229510 | A1* | 8/2014 | Yu ..................... G06F 17/30958 707/798 |
| 2015/0046384 | A1* | 2/2015 | Eck ........................ G06F 17/18 706/52 |

OTHER PUBLICATIONS

Li, Yize et al., "Expertise Search in a Time-varying Social Network," Proceedings WAIM 2008: The Ninth International Conference on Web-Age Information Management, Zhangjiajie, China, Jul. 20-22, 2008, 8 pages. Copy available at http://keg.cs.tsinghua.edu.cn/jietang/publications/WAIM08-Li&Tang-Temporal-Expert-Finding.pdf accessed Aug. 30, 2013.

Zignani, Matteo, "Human Mobility Model Based on Time-Varying Bipartite Graph," 2011 IEEE International Symposium on a World of Wireless, Mobile, & Multimedia Networks (WoWMom), Lucca, Tuscany, Italy, Jun. 20-23, 2011, 4 pages, IEEE Digital Library ISBN# 978-1-4577-0351-5/11.

Zheng, Aihua, "A General State-Based Temporal Pattern Recognition," Doctoral Thesis, The University of Greenwich, School of Computing and Mathematical Science, Jan. 2012, 222 pages, Greenwich Academic Literature Archive (GALA), University of Greenwich open access repository. Copy available at http://gala.gre.ac.uk accessed Sep. 3, 2013.

Alon, Noga, "A simple algorithm for edge-coloring bipartite multigraphs," Journal of Information Processing Letters, Mar. 31, 2003, 3 pages, vol. 85, Issue 6. Copy available at http://www.cs.tau.ac.il/~nogaa/PDFS/lex2.pdf accessed Aug. 30, 2013.

* cited by examiner

SYSTEMS AND METHODS FOR DISCOVERING TEMPORAL PATTERNS IN TIME VARIANT BIPARTITE GRAPHS

BACKGROUND

A bipartite graph is a set of nodes having two disjoint sets such that no two graph nodes within the same set are adjacent to one another. Bipartite graphs, involving two types of entities and their relationships, emerge in plethora of real life scenarios such as a sequence containing a call list between an agent (entity type I) and an account (entity type II), a sequence containing the sales data for various agents (entity type I) to various accounts (entity type II), etc. In all such scenarios, an entity type I (e.g., agent) is connected (has an edge in the graph) with an entity type II (e.g., account) if a call/sale is made between them. Two entities, of type I and II, respectively, would thus have an edge between them in a bipartite graph if there existed a tuple linking them in the sequence.

BRIEF SUMMARY

In summary, one aspect of the invention provides a method of identifying entities sharing a temporal pattern using bipartite graphs, the method comprising: utilizing at least one processor to execute computer code configured to perform the steps of accessing a sequence of records involving a plurality of entities, each of the entities belonging to one of two entity types; creating a sequence of bipartite graphs for the sequence of records, wherein the sequence of bipartite graphs varies according to time, based on the sequence of records; and identifying at least one temporal pattern in the sequence of bipartite graphs for at least two of the entities.

Another aspect of the invention provides a computer program product for identifying entities sharing a temporal pattern using bipartite graphs, the computer program product comprising: a computer readable storage medium having computer readable program code embodied therewith, the computer readable program code comprising: computer readable program code configured to access a sequence of records involving a plurality of entities, each of the entities belonging to one of two entity types; computer readable program code configured to create a sequence of bipartite graphs for the sequence of records, wherein the sequence of bipartite graphs varies according to time, based on the sequence of records; and computer readable program code configured to identify at least one temporal pattern in the sequence of bipartite graphs for at least two of the entities.

A further aspect of the invention provides an apparatus for identifying entities sharing a temporal pattern using bipartite graphs, the apparatus comprising: at least one processor; and a computer readable storage medium having computer readable program code embodied therewith and executable by the at least one processor, the computer readable program code comprising: computer readable program code configured to access a sequence of records involving a plurality of entities, each of the entities belonging to one of two entity types; computer readable program code configured to create a sequence of bipartite graphs for the sequence of records, wherein the sequence of bipartite graphs varies according to time, based on the sequence of records; and computer readable program code configured to identify at least one temporal pattern in the sequence of bipartite graphs for at least two of the entities.

An additional aspect of the invention provides a method of identifying entities sharing a temporal pattern using bipartite graphs, the method comprising: coding, utilizing at least one processor, edges between business and customer entity types in a sequence of bipartite graphs for a sequence of records involving business and customer entity types, wherein records of the sequence of bipartite graphs vary according to time; identifying, utilizing the at least one processor, at least one temporal pattern in the sequence of bipartite graphs; identifying, utilizing the at least one processor, a time-based relationship between at least two entities in the sequence of bipartite graphs according to the at least one temporal pattern; and outputting, utilizing the at least one processor, an identification of the at least two entities having the time-based relationship.

Another aspect of the invention provides a method of identifying entities sharing a temporal pattern using bipartite graphs, the method comprising: coding, utilizing at least one processor, edges between business and customer entity types in a sequence of bipartite graphs for a sequence of records involving business and customer entity types, wherein records of the sequence of bipartite graphs vary according to time; identifying, utilizing the at least one processor, at least one temporal pattern in the sequence of bipartite graphs; identifying, utilizing the at least one processor, a plurality of time-based relationships between entities in the sequence of bipartite graphs; and identifying, utilizing the at least one processor, at least one trend reflected by the plurality of time-based relationships between entities.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
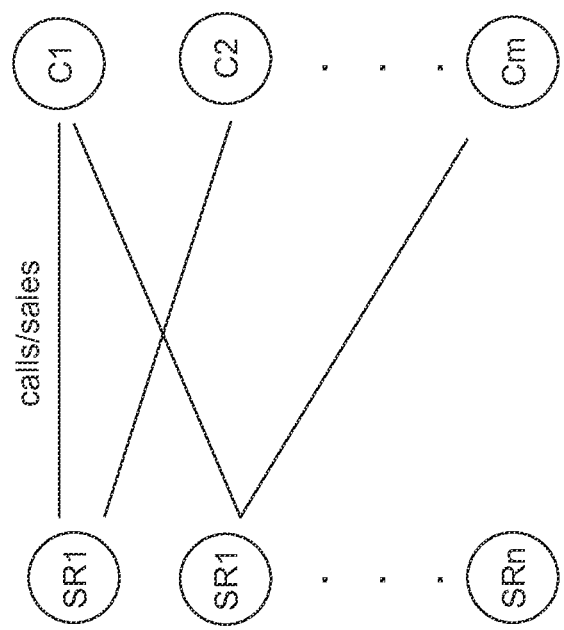
FIG. 1 illustrates an example bipartite graph.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" for the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12 in FIG. 5. In accordance with an example embodiment, most if not all of the process steps, components and outputs discussed with respect to FIGS. 1-4 can be performed or utilized by way of a processing unit or units and system memory such as those indicated, respectively, at 16 and 28 in FIG. 5, whether on a server computer, a client computer, a node computer in a distributed network, or any combination thereof.

As described herein, bipartite graphs include information about related entity types. For example, a bipartite graph may include information such as a sequence containing a call list between an agent (entity type I) and an account (entity type II). The underlying data or records (e.g., business records such as call records, sales records, and/or account records) from which a bipartite graph may be formed vary over time. A bipartite graph conventionally does not capture the time varying quality of the records.

Accordingly, an embodiment provides a time variant bipartite graph. In an example, an embodiment uses records, e.g., business records, which contain data that vary with time (e.g., sales amounts for a particular business unit on a particular customer account) and uses this time varying record data to construct a sequence of bipartite graphs. The sequence of bipartite graphs may then have imparted thereto time variant information, e.g., increasing or decreasing sales, customer contacts/calls, etc. In an example, the time variant data are represented in a bipartite graph using color coded (simply referred to herein as "coded") edges between the nodes or entity types. Given a sequence of such bipartite graphs, an embodiment is further able to identify entities having a temporal pattern. For example, a business unit (e.g., entity type I) may see increasing sales to a particular customer in a given period of time, which is reflected in the bipartite graph containing such information (i.e., time variant bipartite graph having coded edges).

Additionally, given the ability (provided by embodiments) to identify such temporal patterns, an embodiment may leverage this information to identify trends stemming from a time-based relationship between entities. As an example, an embodiment may identify like temporal patterns (e.g., increasing sales) for two business entities (e.g., business units) and thus identify a time-based relationship between the entities. On the basis of attribute(s) of the entities (e.g., geographic location, business unit type, keywords, etc.), an embodiment may identify trend(s), e.g., business units having a common territory (e.g., east coast of the USA) have increasing sales in a given time period. This may in turn lead to further avenues for exploration of the cause(s) of such trends, which has readily apparent value.

Referring to FIG. 1, an example of a bipartite graph is illustrated. Here, records, e.g., sales representative (SR1, SR2, . . . , SRn) call and sales records to customers (C1, C2, . . . , Cm) are represented in the bipartite graph. In the bipartite graph, the nodes (e.g., SR1, C1) are connected to one another (have an edge) if information exists (tuple) linking the nodes. For example, an edge is indicated between SR1 and C1 because sales representative SR1 called customer C1.

Such a bipartite graph, however, does not contain any information reflecting variation with time. For example, sales representatives, e.g., SR1, may call and/or sell products to customers, e.g., CR1, more or less in given time periods, which are not reflected in the bipartite graph of FIG. 1. Accordingly, an embodiment provides a time variant bipartite graph which includes such information, as outlined in FIG. 2.

Figure 2:
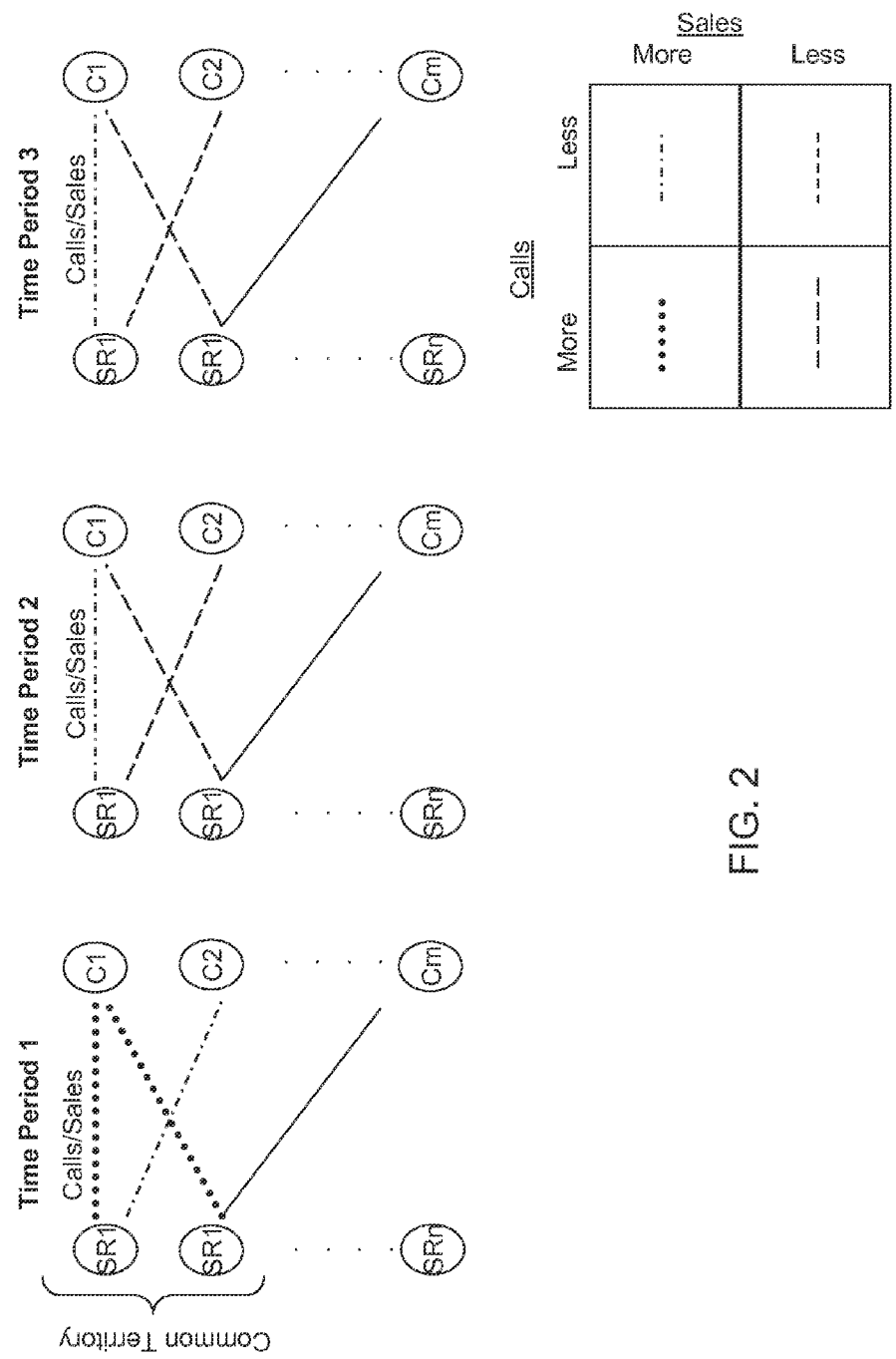
FIG. 2 illustrates an example sequence of bipartite graphs exhibiting time variations (time variant bipartite graphs).
Figure 3:
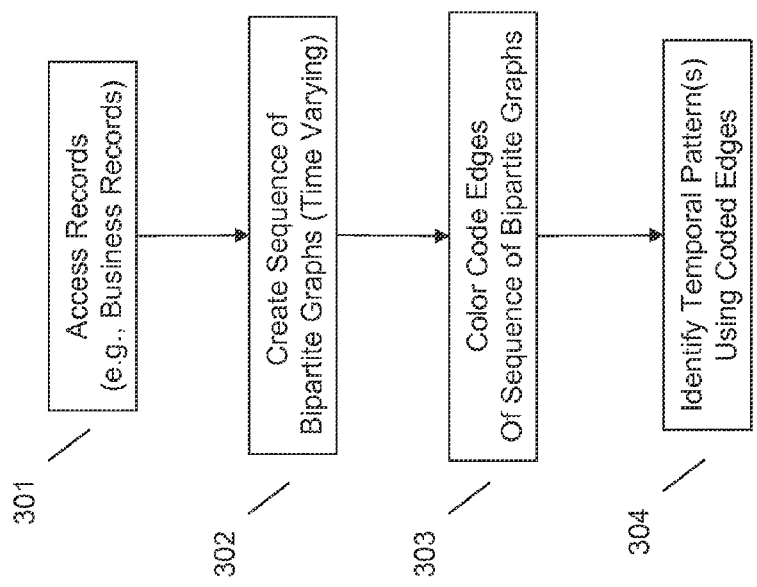
FIG. 3 illustrates an example of discovering temporal patterns in time variant bipartite graphs.

In FIG. 2 a sequence of bipartite graphs is illustrated. In the example of FIG. 2, three time periods are reflected, e.g., time period 1, time period 2 and time period 3. As can be seen, an embodiment codes the edges of the bipartite graph according to the underlying time varying data, i.e., an embodiment creates a time variant bipartite graph.

In time period 1, SR1 calls and sales to C1 are increasing (compared to a comparison metric, e.g., an earlier time period) and this is represented by a coded edge. A key of coded edges is provided in FIG. 2, noting that color coding may be utilized but black and white are utilized for the purposes of this description and figures out of convenience. Also illustrated in FIG. 2, at time period 2, is the fact that the calls between SR1 and C1 have decreased (again, as compared to a comparison metric, e.g., time period 1), but sales between SR1 and C1 have increased, as represented by the coded edge in the bipartite graph. The edges are coded based on the underlying data, e.g., business call and sale records in the example of FIG. 2.

In order to identify a temporal relationship between entities (e.g., SR1 and C1), an embodiment may employ the time varying data, for example as represented by the coded edges of the time variant bipartite graph. Thus, in accessing records at 301, an embodiment may create or construct a sequence of bipartite graphs at 302, such as those illustrated in FIG. 2. As part of this process, at 303, an embodiment may encode the edges of the bipartite graphs such that, for a bipartite graph of a given time period, time varying information is reflected by coded edges between the nodes of the bipartite graph. Thus, time-based variations (e.g., changes in rate of calls, rate of sales, etc.) may be reflected in what is termed a time variant bipartite graph. A sequence of these bipartite graphs (e.g., by day, month, year, or any suitable time unit, smaller or larger, depending on the underlying data or the goals) may be created. Once the sequence of bipartite graphs containing coded edges is formed, an embodiment may identify temporal pattern(s) on the basis of this information.

Temporal patterns may be identified in a variety of ways. For example, in an embodiment where coding is provided by color, for a total of Q distinct color edges in a graph, suppose there are a total of R epochs for which the bipartite graph, G (V, E), exists, i.e., there are R distinct copies of bipartite graph G, denoted by $G^k$, $0<k\leq R$. Here, $E_i^k$ (C) denotes the color of edge $E_i$ in $G^k$. The objective is to identify all patterns of length $L\leq R$. Towards that end, an embodiment bucketizes the patterns. Two patterns, P1 and P2, will be put in same bucket if both have a length of 1 each, for all i such that $0\leq i<1$, $E_i^k(C)_{P2}$.

There are a total of R−L+1 phases. In phase 1, an embodiment puts all edges of distinct colors in $G^1$ in their respective separate buckets. There will be a total of Q different pattern types, of length 1 each. In phase 2, each bucket is subdivided in Q buckets again and each edge is put into its respective bucket as per the color of that edge in G2. At this stage, there are a maximum of $Q^2$ buckets, i.e., $Q^2$ different pattern types. Each bucket with less than 'T' entries is discarded, where 'T' is for example a user defined threshold. An embodiment continues with this scheme until $Q^m > E/T$. Hence, an embodiment will have a maximum of E/T buckets, where E is total number of edges in the graph. Accordingly, an embodiment may identify distinct temporal patterns between entities with respect to the data of the sequence of bipartite graphs.

Figure 4:
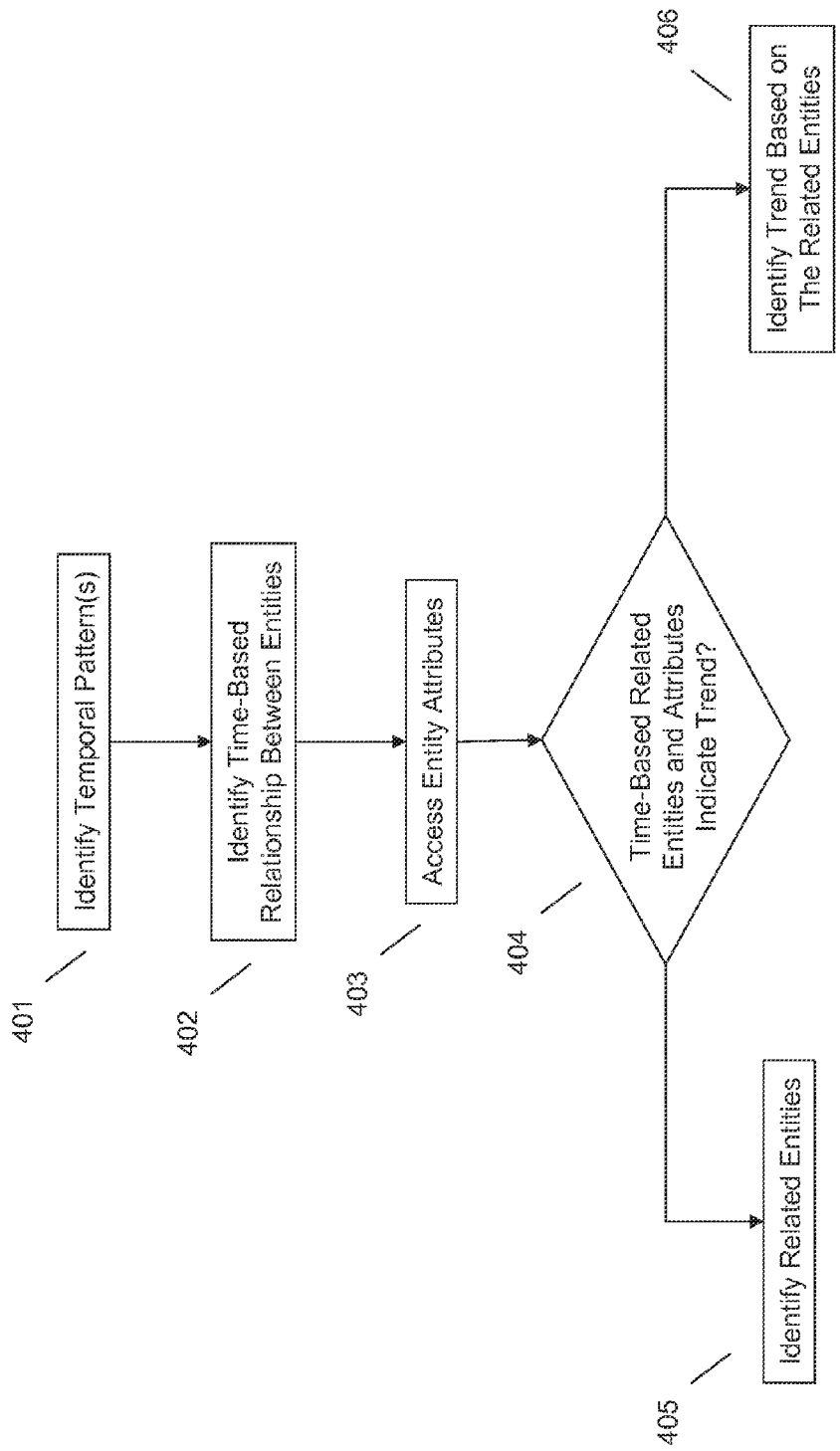
FIG. 4 illustrates an example of identifying trends using discovered temporal patterns in time variant bipartite graphs.

In FIG. 4 it is illustrated that, given temporal patterns that have been identified 401, an embodiment may identify a time-based relationship between entities at 402, e.g., between two business units or sales representatives. This may be accomplished by using the temporal patterns identified, e.g., as briefly outlined above, and accessing entity attributes, for example data associated with the entities such as business unit identifiers, call representative identifiers, geographic location information, product types, etc. Thus, an embodiment may access attribute(s) at 403 and determine if the time-based related entities, e.g., business units, etc., and their attributes, e.g., geographic location, indicate a trend at 404, e.g., increasing sales in a particular territory, decreasing sales of a given product line, etc. If a trend is indicated, it may be identified and indicated/reported at 406 for further analysis and follow up, e.g., an investigation as to why sales suddenly dropped in a particular territory, etc. If no trend is indicated, an embodiment may nonetheless identify related entities at 405, e.g., the time-based relation between business units, such that further analysis may be conducted in an effort to identify a trend.

An embodiment may identify a trend in a variety of ways. For example, for non-empty buckets in phase k, referencing the temporal pattern identification process outlined herein, a grouping of the similar patterns of length k may be made. However, it is not necessary for a pattern or trend to start from $G^1$, i.e., from first instance of the graph only. Therefore, to capture all the patterns, an embodiment may initiate the tracking of patterns at each stage. Therefore at stage 2, there will be at most $Q^2$ different patterns of length 2 and Q different patters of length 1 (and so on).

In terms of complexity (time and space), the maximum number of patterns could at most be E/T. Therefore, the total number of buckets in equilibrium state could be $E/T*(1+1/Q+1/Q^2+ \ldots 1/Q^{m-1})$; $<E/T*(1+1/Q+1/Q^2+ \ldots 1/Q^{m-1}+ \ldots)$; O(E/T). Therefore, the total memory requirement is bounded. Further, each edge is processed at most 'm' times, where m is such that $Q^{m-1}<E/T(Q^m>E/T) \Rightarrow m<\log E$. Therefore, total running time of the process is O(R.E. log E). The total number of edges in R instances of Graph G is R.E.

Once an embodiment identifies such patterns as time-based relationships, an embodiment identifies distinguishing features of such patterns, if there are any, in an effort to identify trend(s). For example, for a pattern P, an embodiment takes the set of all the entities (e.g., sales agents or accounts), and identifies the distinguishing attributes in the related table(s). For instance, most of the sales agents displaying a particular behavior could belong to same geographical region. As another example, most of the accounts involved in given pattern are specialized in treating a particular ailment. Note that discovery of such insights depends on the linkages among relevant tables. If a pattern converges to a small number of distinguishing keywords, an embodiment may link those keywords with unstructured text documents to discover further insights.

Accordingly, it can be appreciated from the foregoing that an embodiment provides a time variant bipartite graph. Additionally, an embodiment may utilize a sequence of such time variant bipartite graphs in order to establish a time-based relationship between entities. Given a time-based relationship, an embodiment may further identify trend(s), for example using entity attributes to highlight interesting time-based relationships between entities of the bipartite graphs.

Figure 5:
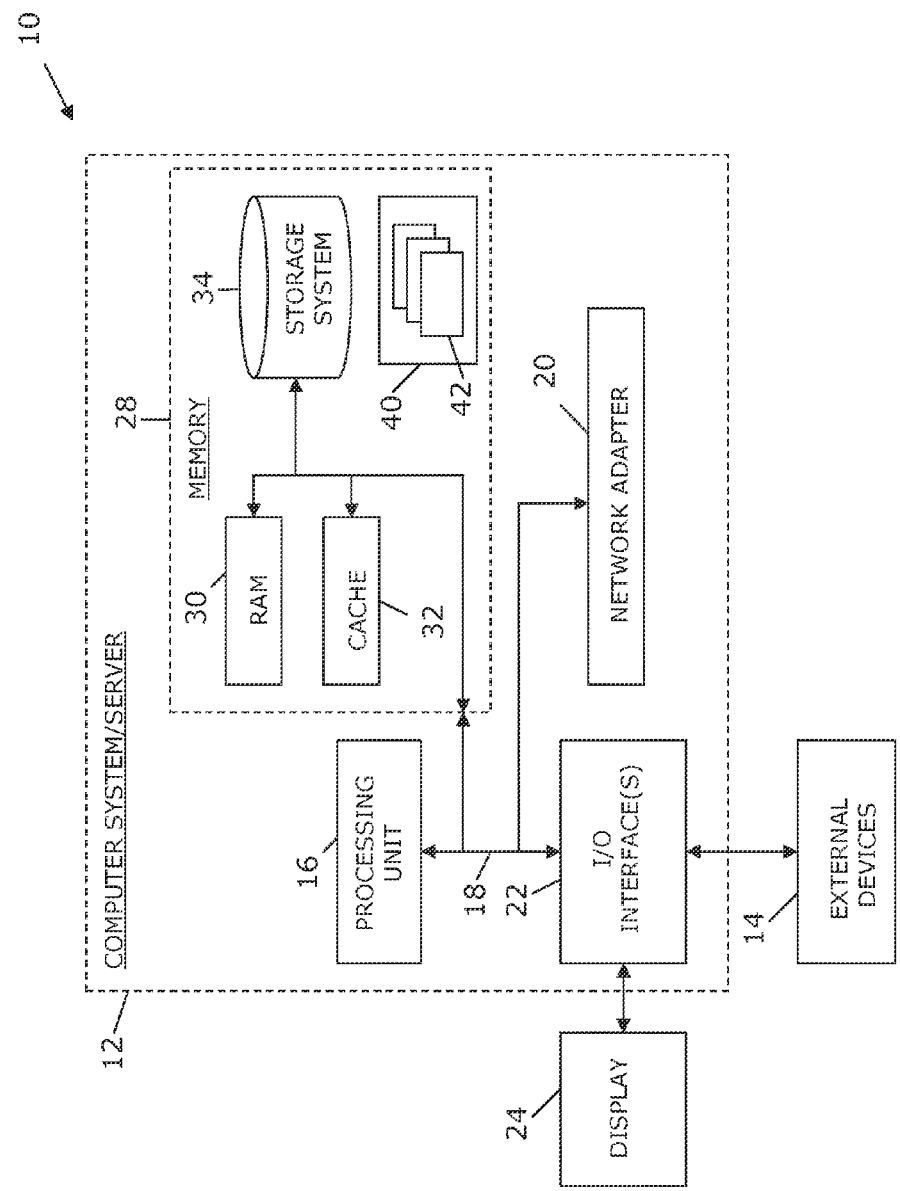
FIG. 5 illustrates an example computing node.

Referring now to FIG. 5, a schematic of an example of a computing node is shown. Computing node 10 is only one example of a suitable cloud computing node and is not intended to suggest any limitation as to the scope of use or functionality of embodiments of the invention described herein. Regardless, computing node 10 is capable of being implemented and/or performing any of the functionality set forth hereinabove. In accordance with embodiments of the invention, computing node 10 may not necessarily even be part of a cloud network but instead could be part of another type of distributed or other network, or could represent a stand-alone node. For the purposes of discussion and illustration, however, node 10 is variously referred to herein as a "cloud computing node".

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, at least one processor or processing unit 16, a system memory 28, and a bus 18 that couples various system components including system memory 28 to processor 16.

Bus 18 represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of compute system readable media. Such media lay be any available media that are accessible by computer system/server 12, and include both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by at least one data media interface. As will be further depicted and described below, memory 28 may include at least one program product having a set (e.g., at least one) of program modules that are configured to carry out the functions of embodiments of the invention.

Program/utility 40, having a set (a least one) of program modules 42, may be stored in memory 28 (by way of example, and not limitation), as well as an operating system, at least one application program, other program modules, and program data. Each of the operating sys ms, at least one application program, other program modules, and program data or some combination thereof may include an implementation of a networking environment. Program modules 42 generally carry out the functions and/or methodologies of embodiments of the invention as described herein.

Computer system/server 12 may also communicate with at least one external device 14 such as a keyboard, a pointing device, a display 24, etc.; at least one device that enables a user to interact with computer system/server 12; and/or any devices (e.g., network card, modem, etc.) that enable computer system/server 12 to communicate with at least one other computing device. Such communication can occur via I/O interfaces 22. Still yet, computer system/server 12 can communicate with at least one network such as a local area network (LAN), a general wide area network (WAN), and/or a public network (the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system.". Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium nay be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer ma be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method of identifying entities sharing a temporal pattern using bipartite graphs, said method comprising:
utilizing at least one processor to execute computer code configured to perform the steps of:
accessing a sequence of records involving a plurality of entities, each of the entities belonging to one of two entity types;
creating a sequence of bipartite graphs for the sequence of records, wherein each of the bipartite graphs contained within the sequence of bipartite graphs comprises a bipartite graph corresponding to a relationship between at least two of the plurality of entities at a time period as compared to a comparison metric, wherein the time period of one bipartite graph is different than the time period of the other bipartite graphs in the sequence, based on the sequence of records, wherein the relationship is denoted by coded edges between the at least two of the plurality of entities; and
identifying at least one temporal pattern in the sequence of bipartite graphs for at least two of the plurality of entities, wherein the identifying at least one temporal pattern comprises identifying the coded edges having a predetermined pattern, grouping the predetermined patterns into groups of patterns, each group corresponding to patterns of a predetermined length, and assigning each of the coded edges to one of the groups based upon the predetermined pattern of the coded edges;
wherein the identifying at least one temporal pattern comprises subdividing each group subgroups, assigning each of the coded edges to one of the subgroups, discarding subgroups having a number of coded edges less than a predetermined threshold, and iteratively subdividing, assigning, and discarding until a predetermined number of subgroups remains.

2. The method of claim 1, comprising coding edges between entities in the sequence of bipartite graphs.

3. The method of claim 1, wherein said identifying comprises identifying a time-based relationship between at least two of the entities in the sequence of bipartite graphs.

4. The method of claim 3, wherein said identifying of at least one temporal pattern comprises identifying at least one trend reflected by a plurality of time-based relationships between entities.

5. The method of claim 3, wherein:
the at least two entities having the time-based relationship comprise nodes belonging to different entity types; and
the time-based relationship comprises a change in a quantity shared by the nodes belonging to different entity types.

6. The method of claim 5, wherein said identifying of the time-based relationship comprises providing an indication distinguishing the time-based relationship comprising the change in quantity from at least one other time-based relationship between nodes.

7. The method of claim 1, wherein said identifying comprises:
identifying a plurality of time-based relationships between a plurality of entities in the sequence of bipartite graphs according to the at least one temporal pattern; and
identifying at least one trend reflected by the plurality of time-based relationships.

8. The method of claim 7, wherein said identifying of at least one trend comprises identifying via using entity attributes.

9. The method of claim 8, wherein the entity attributes are selected from the group of attributes consisting of: geographic region, business unit, product type, and keyword.

10. The method of claim 9, wherein:
said entity attributes comprise a keyword; and
said method comprises linking a keyword to at least one text document containing the keyword.

11. A computer program product for identifying entities sharing a temporal pattern using bipartite graphs, said computer program product comprising:
a computer readable storage medium having computer readable program code embodied therewith, the computer readable program code comprising:
computer readable program code configured to access a sequence of records involving a plurality of entities, each of the entities belonging to one of two entity types;
computer readable program code configured to create a sequence of bipartite graphs for the sequence of records, wherein each of the bipartite graphs contained within the sequence of bipartite graphs comprises a bipartite graph corresponding to a relationship between at least two of the plurality of entities at a time period as compared to a comparison metric, wherein the time period of one bipartite graph is different than the time period of the other bipartite graphs in the sequence, based on the sequence of records, wherein the relationship is denoted by coded edges between the at least two of the plurality of entities; and
computer readable program code configured to identify at least one temporal pattern in the sequence of bipartite graphs for at least two plurality of the entities, wherein the identifying at least one temporal pattern comprises identifying the coded edges having a predetermined pattern, grouping the predetermined patterns into groups of patterns, each group corresponding to patterns of a predetermined length, and assigning each of the coded edges to one of the groups based upon the predetermined pattern of the coded edges;
wherein the identifying at least one temporal pattern comprises subdividing each group subgroups, assigning each of the coded edges to one of the subgroups, discarding subgroups having a number of coded edges less than a predetermined threshold, and iteratively subdividing, assigning, and discarding until a predetermined number of subgroups remains.

12. The computer program product of claim 11, wherein the computer readable program code comprises computer readable program code configured to code edges between entities in the sequence of bipartite graphs.

13. The computer program product of claim 11, wherein the computer readable program code comprises computer readable program code configured to identify a time-based relationship between at least two of the entities in the sequence of bipartite graphs.

14. The computer program product of claim 13, wherein the computer readable program code comprises computer readable program code configured to identify at least one trend reflected by a plurality of time-based relationships between entities.

15. The computer program product of claim 13, wherein:
the at least two entities having the time-based relationship comprise nodes belonging to different entity types; and
the time-based relationship comprises a change in a quantity shared by the nodes belonging to different entity types.

16. The computer program product of claim 15, wherein identifying the time-based relationship comprises providing an indication distinguishing the time-based relationship comprising the change in quantity from at least one other time-based relationship between nodes.

17. The computer program product of claim 11, wherein the computer readable program code comprises computer readable program code configured to:
identify a plurality of time-based relationships between a plurality of entities in the sequence of bipartite graphs according to the at least one temporal pattern; and
identify at least one trend reflected by the plurality of time-based relationships.

18. The computer program product of claim 17, wherein the at least one trend is identified using entity attributes.

19. The computer program product of claim 18, wherein the entity attributes are selected from the group of attributes consisting of: geographic region, business unit, product type, and keyword.

20. An apparatus for identifying entities sharing a temporal pattern using bipartite graphs, said apparatus comprising:
at least one processor; and
a computer readable storage medium having computer readable program code embodied therewith and executable by the at least one processor, the computer readable program code comprising:
computer readable program code configured to access a sequence of records involving a plurality of entities, each of the entities belonging to one of two entity types;
computer readable program code configured to create a sequence of bipartite graphs for the sequence of records, wherein each of the bipartite graphs contained within the sequence of bipartite graphs comprises a bipartite graph corresponding to a relationship between at least two of the plurality of entities at a time period as compared to a comparison metric, wherein the time period of one bipartite graph is different than the time period of the other bipartite graphs in the sequence, based on the sequence of records, wherein the relationship is denoted by coded edges between the at least two of the plurality of entities; and
computer readable program code configured to identify at least one temporal pattern in the sequence of bipartite graphs for at least two of the plurality of entities, wherein the identifying at least one temporal pattern comprises identifying the coded edges having a predetermined pattern, grouping the predetermined patterns into groups of patterns, each group corresponding to patterns of a predetermined length, and assigning each of the coded edges to one of the groups based upon the predetermined pattern of the coded edges;
wherein the identifying at least one temporal pattern comprises subdividing each group subgroups, assigning each of the coded edges to one of the subgroups, discarding subgroups having a number of coded edges less than a predetermined threshold, and iteratively subdividing, assigning, and discarding until a predetermined number of subgroups remains.

21. A method of identifying entities sharing a temporal pattern using bipartite graphs, said method comprising:
coding, utilizing at least one processor, edges between business and customer entity types in a sequence of bipartite graphs for a sequence of records involving business and customer entity types, wherein records of the sequence of bipartite graphs vary according to time, wherein each of the bipartite graphs contained within the sequence of bipartite graphs comprises a bipartite graph corresponding to a relationship between a business entity type and a customer entity type at a time period as compared to a comparison metric, wherein the time period of one bipartite graph is different than the time period of the other bipartite graphs in the sequence, wherein the relationship is denoted by coded edges between the at least two of the plurality of entities;

identifying, utilizing the at least one processor, at least one temporal pattern in the sequence of bipartite graphs, wherein the identifying at least one temporal pattern comprises identifying the coded edges having a predetermined pattern, grouping the predetermined patterns into groups of patterns, each group corresponding to patterns of a predetermined length, and assigning each of the coded edges to one of the groups based upon the predetermined pattern of the coded edges;

wherein the identifying at least one temporal pattern comprises subdividing each group subgroups, assigning each of the coded edges to one of the subgroups, discarding subgroups having a number of coded edges less than a predetermined threshold, and iteratively subdividing, assigning, and discarding until a predetermined number of subgroups remains;

identifying, utilizing the at least one processor, a time-based relationship between at least two entities in the sequence of bipartite graphs according to the at least one temporal pattern; and outputting, utilizing the at least one processor, an identification of the at least two entities having the time-based relationship.

22. A method of identifying entities sharing a temporal pattern using bipartite graphs, said method comprising:

coding, utilizing at least one processor, edges between business and customer entity types in a sequence of bipartite graphs for a sequence of records involving business and customer entity types, wherein records of the sequence of bipartite graphs vary according to time, wherein each of the bipartite graphs contained within the sequence of bipartite graphs comprises a bipartite graph corresponding to a relationship between a business entity type and a customer entity type at a time period as compared to a comparison metric, wherein the time period of one bipartite graph is different than the time period of the other bipartite graphs in the sequence, wherein the relationship is denoted by coded edges between the at least two of the plurality of entities;

identifying, utilizing the at least one processor, at least one temporal pattern in the sequence of bipartite graphs, wherein the identifying at least one temporal pattern comprises identifying the coded edges having a predetermined pattern, grouping the predetermined patterns into groups of patterns, each group corresponding to patterns of a predetermined length, and assigning each of the coded edges to one of the groups based upon the predetermined pattern of the coded edges;

wherein the identifying at least one temporal pattern comprises subdividing each group subgroups, assigning each of the coded edges to one of the subgroups, discarding subgroups having a number of coded edges less than a predetermined threshold, and iteratively subdividing, assigning, and discarding until a predetermined number of subgroups remains;

identifying, utilizing the at least one processor, a plurality of time-based relationships between entities in the sequence of bipartite graphs; and identifying, utilizing the at least one processor, at least one trend reflected by the plurality of time-based relationships between entities.

23. The method according to claim 22, wherein:
the at least one trend comprises a plurality of classifiable trends; and
the classifiable trends are identified by differential coding.

24. The method according to claim 23, wherein the classifiable trends include:
a time-based increase in a predetermined interaction type between entities; and
a time-based decrease in the predetermined interaction type between entities.

25. The method according to claim 24, wherein the classifiable trends further include:
a time-based increase in an additional predetermined interaction type between entities; and
a time-based decrease in the additional predetermined interaction type between entities.

* * * * *